UNITED STATES PATENT OFFICE.

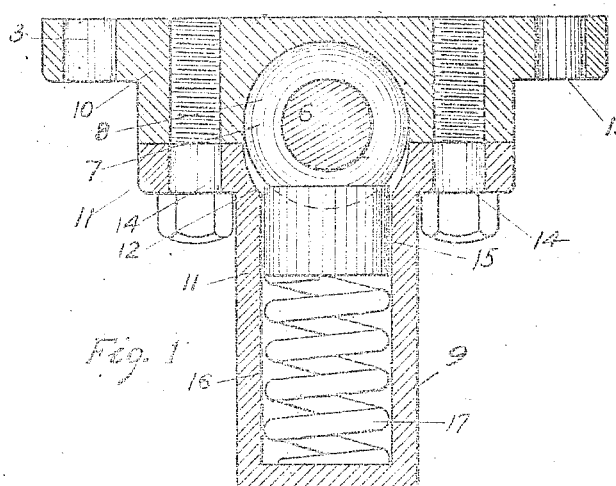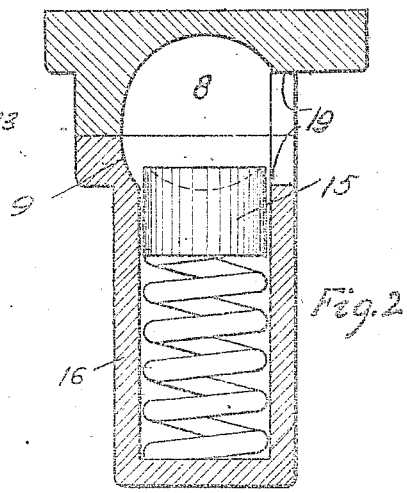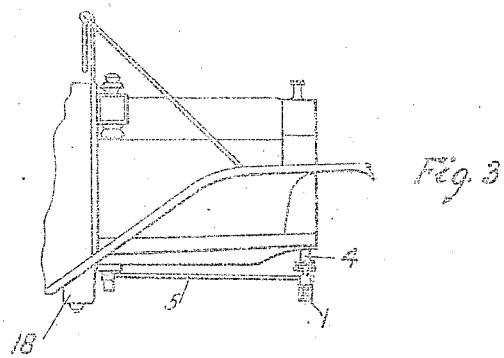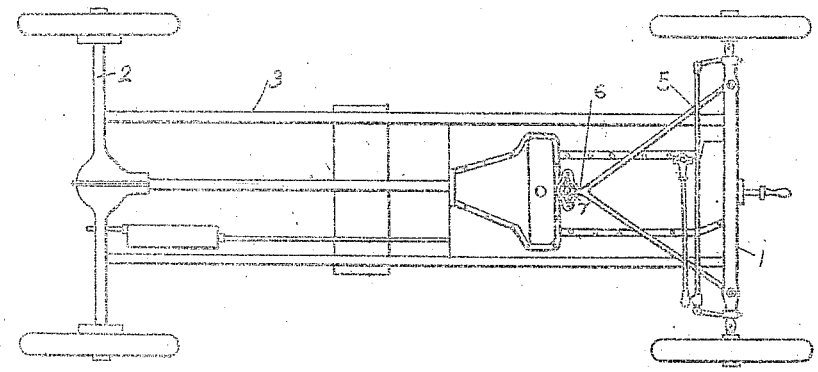

HENRY C. KIRK, JR., OF BALTIMORE, MARYLAND.

THRUST-BEARING.

1,044,468.

Specification of Letters Patent.

Patented Nov. 12, 1912.

Application filed June 7, 1912. Serial No. 702,173.

*To all whom it may concern:*

Be it known that I, HENRY C. KIRK, Jr., a citizen of the United States of America, residing at city of Baltimore, State of Maryland, have invented certain new and useful Improvements in Thrust-Bearings, of which the following is a specification.

This invention relates to a ball and socket thrust bearing, particularly adapted for use in connection with the radius rods for taking up the horizontal thrust applied to the front axle of a self-propelled road vehicle. The running gear of vehicles of this type, as commonly constructed, consists of a frame and front and rear axles, the weight of the frame and body being transmitted to the axles by means of springs, but these springs, while they take up the vertical vibration, are not well adapted to resist the horizontal thrust, and in the particular type of road vehicle to which I refer, resistance to this thrust is provided, in the case of the front axles, by means of rods which are connected at their forward ends to the front axle, and which, at their rear ends are provided with a ball which is seated in a socket in the frame.

In the type of machine which is now in use, the socket is split on a horizontal plane, the upper part of the socket, which is the larger, being rigidly secured to the frame. The lower part of the socket is made shallower than the upper and is bolted thereto. The rods thus are in effect pivoted arms upon which the front axle swings vertically relatively to the frame and rocks laterally. They are therefore known as radius rods. The longitudinal thrust is received by the rods and transmitted to the bearing socket, and the bearing at this point is herein termed a thrust bearing.

In the bearing which I have described, there is an opening at the front to admit the end of the radius rods to which the ball is attached, and in order to make free movement of the rods possible, this opening must be ample. Therefore it admits dust and grit, considerable wear occurs and the bearing becomes loose and rapping and pounding result. The bottom cup is deepened by the wear and grinding, and the ball drops and takes its bearing therein, so that the thrust is received by this part of the socket instead of by the top portion which is secured to the engine frame. Under these circumstances the bottom cup becomes loose. In this condition shearing of the bolts might easily happen with disastrous results to the occupants of the vehicle, and under all circumstances of prolonged service, the bearing demands continued and repeated attention. To stop the rattling and return the ball to its seat in the bearing, the cup or socket is opened and filler plates are inserted, and the bolts again tightened. Such tightening is frequently overdone so that cramping of the ball results with bending of the radius rods. For the purpose of overcoming these difficulties, I have provided a ball and socket thrust-bearing in which there is resilient means acting at an angle to the radius rods, preferably upward, for the purpose of maintaining the ball in its bearing. This device also serves to prevent rattling and pounding, so that attention to the bearing is practically unnecessary.

In the preferred form of the invention the means for maintaining the ball in its seat or bearing in the socket consists of a piston or block adapted to engage the ball and having a sliding seat in the wall of the socket, preferably in a removable member or bottom cup. This piston is pressed against the ball by means of a spring so that all the wear is taken up and the ball is maintained in its bearing.

In the accompanying drawing I have illustrated, fragmentarily, certain portions of a self-propelled road vehicle or automobile to which the device of my invention, in its preferred form, has been applied.

Figure 1 is a vertical, central, transverse section through the socket, a ball being shown therein, the shank in which the radius rods terminate being sectioned adjacent the ball. Fig. 2 is a section through the socket taken at right angles to Fig. 1. Fig. 3 is a fragmentary, side elevation of the front portion of the machine showing the front axles and radius rods. Fig. 4 is a bottom plan of a portion of the running gear illustrating the radius rods and bearing-socket, etc.

In the type of vehicle shown there is a front axle 1 and a rear axle 2, and a frame 3 extending from front to rear. The frame is supported on the axles by means of springs 4. To take up the longitudinal thrust which is applied to the front axle and transmit it to the frame, I provide radius rods 5 which are connected at their forward ends to the front axle 1, the rods, as shown, being spaced apart at the front so that one joins the axle a short distance from each end, and from this point they converge toward the rear, being shown in the drawings herewith as meeting at a point near the plane of the crank arm. At their vertex 6 the radius rods carry a ball 7 rigidly secured to both rods and preferably formed integral therewith. This ball is mounted in a socket 8 on the frame, this socket being shown as secured to the engine base adjacent the crank case.

The socket 8, as shown, is formed of two cupped members 10 and 11, these members being joined on a horizontal plane so that the cups register to form a substantially spherical socket or chamber 12 slightly flattened at the equatorial zone and having an opening 19 for the radius rod shank. The upper cup 10 is the deeper of the two, and the member in which it is formed is rigidly secured to the frame or to any convenient rigid support, as the engine base 18 in connection with which it is shown in Figs. 3 and 4. For this purpose bolts or screws may be used, or the member may be cast integral with the engine frame. To receive bolts to fasten the socket to the frame, I have shown bolt holes 13, and to receive bolts to attach the bottom cup to the top cup, I have shown bolt holes 14. The upper cup forms the bearing for the ball and is constructed and intended to take the thrust applied to the radius rods. It is therefore desirable to maintain the ball in its bearing in this cup, and to this end I provide resilient means which tend to press it constantly upward into this bearing. For this purpose I have shown a piston or sliding block 15 mounted to slide in a suitable guideway 16 in the bottom cup or member 11. The block 15 is forced upward by means of a spring 17 seated in the aperture 16 beneath the sliding block or piston 15. As shown, the piston 15 is slightly cupped to engage the surface of the ball.

The operation of the device will be apparent from the description taken in connection with the drawing. The upper cup, being made deeper than the bottom one, is intended to act as a bearing for the ball, the bottom cup being merely provided as a cover or retainer to hold the ball in position, but in the absence of some means to force the ball constantly upward, the natural wear, resulting from deposited grit in the bottom cup, causes the ball to become loose and rattle and pound. At the same time the thrust line is lowered, due to dropping of the ball, so that the bottom cup takes the thrust, and finally the bottom cup is loosened and there is a tendency to shear the bolts. However, the resilient means which I have provided, shown in the form of a spring and a piston, serves to maintain the ball in its bearing in the top or deeper cup, so that no rattling takes place and wear of the castings does not vary the seat of the ball or introduce a tendency to pound. Adjustment is not necessary and the bearing does not cramp.

I have thus described a single embodiment of my invention in order that its nature and operation may be clearly understood. However, the specific terms herein are used in their descriptive rather than in their limiting sense and the scope of the invention is defined in the claim.

I claim—

In a running gear for road vehicles having axles and a frame, and springs connecting the front axle to the frame, in combination radius rods engaging the front axle, extending backward and having a ball at their rear ends, a cup forming a bearing for the ball and rigidly secured to the frame and inclosing substantially half the ball so as to receive the thrust therefrom, and resilient means for maintaining the ball in its bearing in the cup.

Signed by me at Baltimore, Maryland, this 6th day of June 1912.

HENRY C. KIRK, Jr.

Witnesses:
EDWARD L. BASH.
EDWIN F. SAMUELS.